United States Patent [19]
Bohn

[11] Patent Number: 4,731,569
[45] Date of Patent: Mar. 15, 1988

[54] APPARATUS FOR CONTROLLING A MAGNET IN A MAGNETICALLY SUSPENDED VEHICLE HAVING A LINEAR STATOR

[75] Inventor: Gerhard Bohn, Munich, Fed. Rep. of Germany

[73] Assignee: Messerschmitt-Boelkow-Blohm GmbH, Munich, Fed. Rep. of Germany

[21] Appl. No.: 853,614

[22] Filed: Apr. 18, 1986

Related U.S. Application Data

[63] Continuation-in-part of Ser. No. 715,495, Mar. 25, 1985, Pat. No. 4,587,472.

[30] Foreign Application Priority Data

Apr. 27, 1985 [DE] Fed. Rep. of Germany ....... 3515350

[51] Int. Cl.$^4$ .............................................. G05B 11/00
[52] U.S. Cl. ..................................... 318/687; 318/135; 318/38; 310/12; 310/13; 104/291; 104/292; 104/290
[58] Field of Search ................. 318/38, 687, 135, 136, 318/138, 118, 608, 628, 629, 631, 632, 611, 615, 616, 617; 310/12, 13, 14; 104/290, 291, 292, 293, 294, 297, 298, 300, 303

[56] References Cited

U.S. PATENT DOCUMENTS

| 3,894,275 | 7/1975 | Baumans et al. | 318/687 X |
|---|---|---|---|
| 3,904,942 | 9/1975 | Holtz | 318/135 X |
| 3,914,669 | 10/1975 | Holtz | 318/135 X |
| 3,914,670 | 10/1975 | Holtz | 318/135 X |
| 3,919,607 | 11/1975 | Habock et al. | 318/135 |
| 4,368,413 | 1/1983 | Tazaki | 318/687 |
| 4,505,206 | 3/1985 | Gottzein et al. | 318/135 X |
| 4,509,001 | 4/1985 | Wakabayashi et al. | 318/608 X |
| 4,595,870 | 6/1986 | Chitayat | 318/687 |
| 4,626,749 | 12/1986 | Asakawa | 318/687 X |

FOREIGN PATENT DOCUMENTS 3411190 11/1985 Fed. Rep. of Germany .

Primary Examiner—William M. Shoop, Jr.
Assistant Examiner—Paul Ip
Attorney, Agent, or Firm—W. G. Fasse; D. H. Kane, Jr.

[57] ABSTRACT

A magnet controller for a magnetically suspended vehicle of the linear stator type for travelling along a rail track (1) forming a linear stator having teeth of uniform determined width, responds to a rectified control signal. The control parameters for the magnet controller (21) are adjusted in response to speed to assure a stable control during standstill and at low speeds and to achieve a good response or follower characteristic of the control system at high speeds. A speed representing signal ($U_v$) is generated in a conductor loop, preferably a double loop (9), inserted into a groove (10) of the poles (5) of the levitation magnets (2). The signal ($U_v$) generated in the conductor loop is rectified at (31), and if desired passed through a low-pass filter (32) to provide the control input signal for the controller (21) by a very simple circuit. Utilizing just the amplitude of the speed signal ($U_v$) has been found to be satisfactory for achieving a stable closed loop control of the magnetically suspended vehicle.

5 Claims, 5 Drawing Figures

APPARATUS FOR CONTROLLING A MAGNET IN A MAGNETICALLY SUSPENDED VEHICLE HAVING A LINEAR STATOR

CROSS-REFERENCE TO RELATED APPLICATION

The present application is a continuation-in-part of copending application U.S. Ser. No. 715,495, filed on Mar. 25, 1985, now U.S. Pat. No. 4,587,472.

FIELD OF THE INVENTION

The invention relates to a control circuit for controlling the energization of the levitation magnets in a magnetically suspended vehicle of the linear stator type travelling on a uniformly toothed rail track forming a linear stator with teeth each having a determined width in the travel direction.

MORE DETAILED REFERENCE TO THE PARENT APPLICATION U.S. SER. NO. 715,495

The parent application describes a controller in which the control parameters are variable with the aid of a speed representing signal for maintaining the magnetically suspended vehicle in a stable condition under all operating situations. The speed representing or speed responsive signal is formed by measuring the travelling speed through the frequency of the waveform of the air gap induction. Stated differently, the speed is measured individually for each individual controller in a decentralized manner by means of a conductor loop which generates the respective signal in an inductive manner. A conductor loop is inserted into a groove in the surface of each pole of the levitation magnets. Each conductor loop has a width in the direction of the longitudinal stator, that is in the direction of the toothed track, corresponding to the width of the teeth in the track. When the vehicle travels along the track, the output terminals of the conductor loop provide a waveform signal which is determined by the sequence of teeth and gaps along the track, whereby the frequency of this signal corresponds to the speed of the vehicle. In the parent case this signal is supplied to a frequency analyzer, which, under the simplest circumstances, comprises a three state circuit followed by an evaluation circuit. The evaluation circuit converts digitally or in an analog manner the signal provided by the three state circuit in such a way that it represents directly the base frequency of the speed signal. This base frequency signal is then supplied to an adapting circuit which in turn supplies a speed responsive signal to the magnet controller, whereby the control parameters are adjusted in the desired manner.

OBJECTS OF THE INVENTION

It is the aim of the invention to simplify the circuitry needed for processing the output signal of the conductor loop for controlling the levitation magnets and to avoid using the frequency of the speed representing signal as the basis from which the control signal for the magnet energization is derived.

SUMMARY OF THE INVENTION

According to the invention the control signal for energizing the levitation magnets is derived by simply rectifying the output signal of the conductor loop. It has been found that the rectified signal is proportional to the speed of the magnetically levitated vehicle. If desired, the rectified signal may be passed through a low pass filter, preferably, having a cut-off frequency of about one Hertz.

The simple rectification according to the invention provides the advantage and improvement over the parent case that a frequency analysis is avoided. Experiments conducted with linear stator magnetically levitated or suspended vehicles have shown that it is, surprisingly, satisfactory to simply evaluate the output signal of the conductor loop with regard to its amplitude. An especially advantageous result is achieved if the conductor loop is formed as a double loop having a figure-eight configuration or substantially a figure-eight configuration with two loop halves of equal size, each loop half having a width, in the travel direction, corresponding to the width of the track teeth in the rails forming the stator. This type of double loop eliminates distortions in the signal which otherwise might result due to differences in the magnetic forces, for example, when the vehicle travels through a curve, whereby a distorted signal might be induced in a single loop. It is also advantageous to use the above mentioned low-pass filter having, for example, the mentioned cut-off frequency of about one Hertz, whereby any remaining waviness in the rectified signal is eliminated for all practical purposes because any speed changes of the vehicle within one second are of no consequence.

When plotting the output signal of the low-pass filter as a function of the speed, it was noted that the resulting characteristic is approximately linear in a speed range from zero to one hundred kilometers per hour. In any event, the distortions in this range are so small that they may be disregarded for the closed loop control of the magnet energization. The rectified voltage signal is then supplied either directly or through the mentioned low-pass filter to an adapter circuit which adjusts the control parameters of the magnet controller.

BRIEF DESCRIPTION OF THE DRAWINGS

In order that the invention may be clearly understood, it will now be described, by way of example, with reference to the accompanying drawings, wherein.

Figure 1:
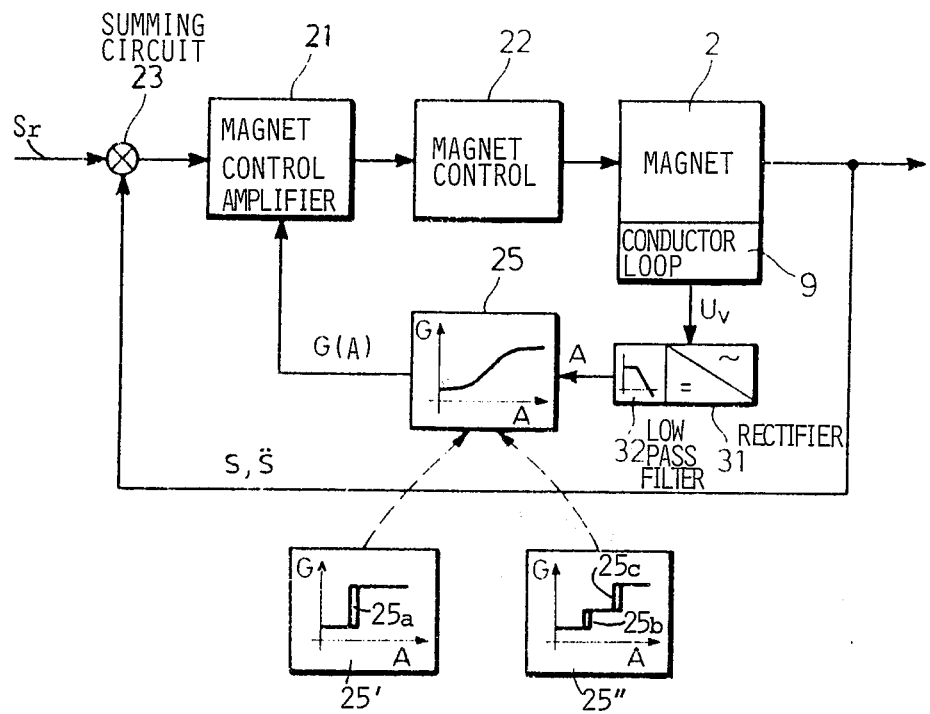
FIG. 1 is a block diagram of a magnet controller according to the invention for a linear stator magnetically levitated vehicle including a rectifier for rectifying the loop output signal.

DETAILED DESCRIPTION OF PREFERRED EXAMPLE EMBODIMENTS AND OF THE BEST MODE OF THE INVENTION

Referring first to FIGS. 2, and 3a to 3c, the levitation rails 1 form a track on which a magnetically levitated vehicle travels in one or the other direction A1. Only one levitation magnet 2 of a vehicle is shown. The rails 1 form a linear stator which is provided with teeth 4 spaced by grooves 3. In the travel direction A1 the grooves 3 and the teeth 4 have a uniform, regular, determined width b. These teeth 4 and grooves 3 face the levitation magnet 2 carrying the vehicle, not shown.

The levitation magnet 2 comprises at each of its ends a pole piece 5, 5' having approximately an L-configuration. A further pole piece 6 having approximately a T-configuration is located intermediate the pole pieces 5, 5'. A magnetic yoke 7 interconnects the pole pieces 5, 5' and 6. Energizing magnetic coils 8 are wound around the pole pieces in a conventional manner. These coils produce a magnetic flux B as shown by dashed lines in FIG. 2, when an electric current flows through the coils 8. An air gap S is to be maintained between the teeth 4 and the surfaces of the pole pieces 5, 5' and 6.

Figure 2:
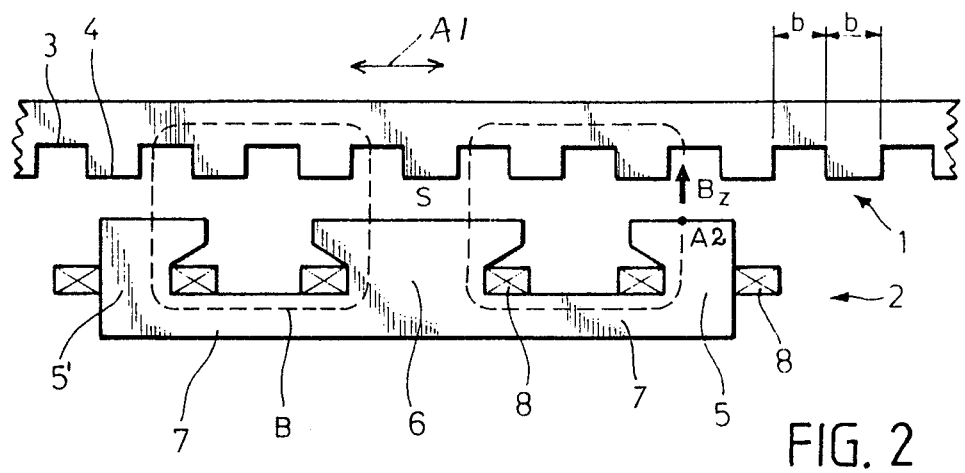
FIG. 2 is a schematic view of a linear stator rail and a levitation magnet of a vehicle for explaining the function of the magnet control according to the invention.

If the levitation magnet 2 travels along the rail track 1, the field strength $B_z$ shown by a respective arrow in FIG. 2 will have a certain waveform depending on the fact whether the fixed point A2 on the pole piece 5 of the levitation magnet 2 is located opposite a groove 3 or opposite a tooth 4. The amplitude of the field strength waveform is larger when the pole piece faces a tooth 4 than when it faces a groove 3.

Figure 3C:
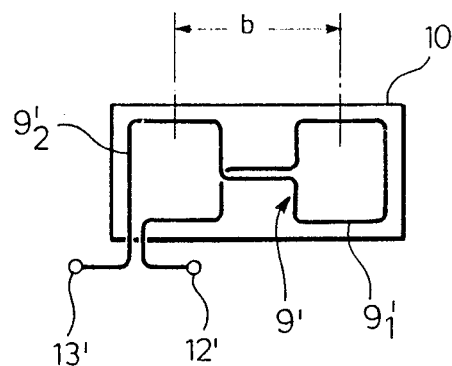
FIG. 3c is a view similar to that of FIG. 3b, but showing a modified configuration for the inductor loop used according to the invention.
Figure 3A:
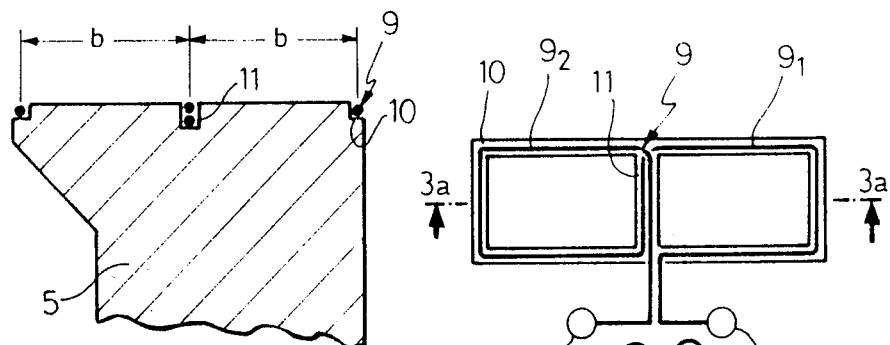
FIG. 3a is a sectional view along section line 3a—3a in FIG. 3b, on an enlarged scale, relative to FIG. 2, through a portion of a pole piece of a levitation magnet to show the location of the induction conductor loop for measuring the speed signal.
Figure 3B:
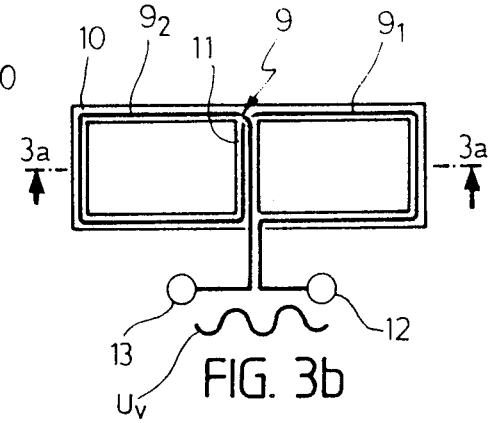
FIG. 3b shows a simplified top plan view of a levitation magnet pole piece for illustrating the configuration of one type of inductor loop used according to the invention.

The invention uses this waveform of the field strength $B_z$ for inducing in a conductor loop 9 an alternating voltage $U_v$ appearing at the output terminals 12, 13 of the conductor loop 9 in FIG. 3b. The loop 9 has, for example, two loop halves 9.1 and 9.2 forming together approximately a figure-eight configuration. The ends of the loop 9 are connected to terminals 12 and 13 from which the alternating voltage signal may be picked up as will be described below. The loop 9 is inserted in grooves 10 and 11 as best seen in FIG. 3a. These grooves are located in the surface, for example of the pole piece 5. Each loop has again a width in the travel direction corresponding to the above mentioned groove and tooth width b, also as shown in FIG. 3a. It will be appreciated, that the voltage induced in the conductor loop 9 and available at the terminals 12, 13 depends on the magnitude of the field amplitude waveform and on the speed of the vehicle. However, the frequency of the induced voltage depends only on the speed of the vehicle.

By inserting the two loop halves in the grooves 10 and 11 and by shaping these loop halves 9.1, 9.2 in such a way, that they have the shown approximate figure-eight configuration, it is possible to eliminate the waviness which is caused by the voltage impulses supplied by the magnet control member 22 and by the magnetic dynamic of the system. The conductor of the double loop 9.1, 9.2 shown in FIG. 3b extends along the periphery of the pole piece 5 in the outer grooves 10, which are interconnected by the central groove 11. As a result the two loop halves 9.1 and 9.2 have two rectangular configurations each having the width b. The central groove 11 is either deeper or wider to accommodate both loop legs. In any event, the voltage $U_v$ is available at the loop terminals 12, 13.

FIG. 3c illustrates a modified double loop 9' having loop halves 9'$_1$ and 9'$_2$. These loops do not contact each other, but are somewhat spaced from each other. The loop halves are so dimensioned that the on-center spacing corresponds to the gap or tooth width b as shown. The voltage $U_v$ is again available at the terminals 13' and 12'.

When the levitation magnets 2 travel along the stator rail 1 a voltage is induced in the loops regardless whether they have the shape shown in FIG. 3b or in FIG. 3c. The frequency of the signal voltage $U_v$ is directly proportional to the vehicle speed v at which the respective loop travels along the rail 1. According to the invention the alternating voltage signal $U_v$ is supplied to a rectifier 31 shown in FIG. 1. The rectifier 31 is, for example, a conventional four-way half wave rectifier. A low-pass filter 32 also shown in FIG. 1, may be used to eliminate the waviness of the rectifier output signal. Preferably, the cut-off frequency of the low-pass filter 32 is about one Hertz. The output signal A of the low-pass filter 32 has an amplitude which is approximately linearly proportional to the speed in a range from zero to one hundred kilometers per hour. It has been measured in connection with an experimental vehicle that this proportionality corresponds to about five volts for each twenty kilometers per hour of speed.

FIG. 1 shows an autonomous closed loop control system 20 for a levitation magnet 2. The system comprises a magnet controller 21, the output signal of which is supplied to a magnet current controller 22 which determines the current flowing through the magnet energizing coils 8 of the levitation magnet 2, thereby controlling the levitation magnetic force. The input signal for the controllers 21 and 22 are supplied by a summing circuit 23 having one input for receiving a signal $S_r$ representing a rated air gap value for the air gap between the carrier rail and the levitation magnet. The summing circuit 23 has another input for receiving measured actual values representing the measured air gap and the second differentiation of the air gap, or rather, the acceleration of the magnets. The resulting signal is then supplied to one input of the controller 21, which has another input receiving a signal G(A). The signal G(A) represents the amplification in the controller 21.

The signal A coming from the output of the low-pass filter 32 is supplied to an input of an adapting circuit 25 which determines the controller amplification G for the magnet controller 21 as a function of the magnitude of the signal A. The output signal G(A) of the circuit 25 controls the amplification in the magnet controller 21. The adapting circuit 25 of FIG. 1 is so dimensioned that the controller amplification G is a continuous function of the magnitude of the signal A from the low-pass filter 32. The amplification begins at small magnitudes corresponding to small speeds of the magnetically levitated vehicle with a small value, then it rises with increasing magnitudes of the signal A corresponding to higher speeds in a continuous manner until the amplification merges into a constant end value corresponding to high magnitudes representing the customary cruising speeds.

Instead of using an adapting circuit 25 with the continuous characteristic as shown, alternate adapting circuits 25' or 25" may be used. These adapting circuits 25' or 25" have stepped characteristics as shown in FIG. 1. The circuit 25' has a characteristic with two steps and a dead zone 25a between the two steps as shown in FIG. 1. The circuit 25" has three steps in its characteristic with two dead zones 25b and 25c. Circuits 25, 25', and 25" are well known in the art and as such are not part of the invention.

When the circuit 25' is used, the amplification in the controller 21 remains constant up to a certain magnitude value of the signal A corresponding to a certain speed of the vehicle, whereby the amplification is maintained at a constant low value. Upon reaching the certain speed value, that is at a higher magnitude of the signal A, the amplification jumps to a higher constant end value.

The characteristic of the circuit 25'' exhibits an intermediate constant amplification value between the low constant amplification value and the high constant amplification value. The mentioned dead zones make sure that a stable closed loop control steering characteristic or steering response is achieved.

Although the invention has been described with reference to specific example embodiments, it will be appreciated, that it is intended to cover all modifications and equivalents within the scope of the appended claims.

What I claim is:

1. An apparatus for controlling the force of a levitation magnet in a magnetically levitated vehicle of the linear stator type, comprising a uniformly toothed rail track forming a linear stator with teeth each having a determined width in the travel direction, levitation magnet means (2) having pole pieces with surfaces facing said rail track teeth, a groove in said pole piece surface, induction conductor loop means (9) in said groove, said induction conductor loop means including output terminals, said conductor loop means having a loop width in the travel direction corresponding to said determined width of said track teeth for inducing in said conductor loop means an alternating signal having a value proportional to the vehicle speed on said track, levitation magnet control circuit means (21, 22) operatively connected to said levitation magnets for energizing said levitation magnets, signal rectifying circuit means (31) operatively connected to said output terminals of said conductor loop means (9) for rectifying said alternating signal to produce a control signal proportional to the vehicle speed, and feedback circuit means connecting an output of said signal rectifying circuit means to said magnet control circuit means for controlling the magnet force in response to said control signal.

2. The apparatus of claim 1, wherein said feedback circuit means comprise a low-pass filter (32) connected to an output of said rectifier circuit means (31) and to said magnet control circuit means.

3. The apparatus of claim 2, wherein said low-pass filter (32) has a cut-off frequency of about one Hertz.

4. The apparatus of claim 1, wherein said induction conductor loop means (9) comprises a double loop having a figure-eight configuration including two equal loop halves, each loop half having a width (b) corresponding to said determined width (b) of said track teeth.

5. The apparatus of claim 1, wherein said induction conductor loop means comprises a double loop (9') having an approximate figure-eight configuration including two equal loop halves, each loop half having its own center, said loop halves being spaced from each other by an on-center spacing corresponding to said width (b) of said track teeth.

* * * * *